US012608504B2

(12) United States Patent
Bhatia et al.

(10) Patent No.: US 12,608,504 B2
(45) Date of Patent: Apr. 21, 2026

(54) IDENTIFICATION AND VISUALIZATION OF TOP-RISK OBJECTS

(71) Applicant: Rubrik, Inc., Palo Alto, CA (US)

(72) Inventors: Anam Bhatia, San Jose, CA (US);
Yuchia Lin, San Francisco, CA (US);
Daniel Nguyen, San Jose, CA (US);
Martin Walter, Livermore, CA (US);
Benjamin Travis Meadowcroft,
Lincoln, CA (US); **Mukul Chandra
Singh Bisht**, Pleasanton, CA (US);
Oded Klimer, San Jose, CA (US)

(73) Assignee: Rubrik, Inc., Palo Alto, CA (US)

( * ) Notice: Subject to any disclaimer, the term of this
patent is extended or adjusted under 35
U.S.C. 154(b) by 73 days.

(21) Appl. No.: 18/198,180

(22) Filed: May 16, 2023

(65) Prior Publication Data

US 2024/0386128 A1     Nov. 21, 2024

(51) Int. Cl.
G06F 21/62         (2013.01)
G06F 3/04817       (2022.01)
G06F 3/0482        (2013.01)

(52) U.S. Cl.
CPC ...... G06F 21/6245 (2013.01); G06F 3/04817
(2013.01); G06F 3/0482 (2013.01); *G06F
2221/2141* (2013.01)

(58) Field of Classification Search
CPC ......... G06F 21/6245; G06F 2221/2141; G06F
3/04817; G06F 3/0482
See application file for complete search history.

(56) References Cited

U.S. PATENT DOCUMENTS

| | | |
|---|---|---|
| D525,264 S | 7/2006 | Chotai et al. |
| D656,954 S | 4/2012 | Arnold et al. |
| D715,313 S | 10/2014 | Hontz, Jr. |
| D746,852 S | 1/2016 | Zhou |
| D752,105 S | 3/2016 | Lee et al. |
| D759,111 S | 6/2016 | Woo et al. |
| D769,315 S | 10/2016 | Scotti |
| D771,115 S | 11/2016 | Wahila et al. |
| D786,912 S | 5/2017 | Kurecka et al. |
| D790,570 S | 6/2017 | Butcher et al. |
| D799,503 S | 10/2017 | Kim et al. |
| D814,510 S | 4/2018 | Cornell |
| D820,305 S | 6/2018 | Clediere |

(Continued)

*Primary Examiner* — Olugbenga O Idowu
(74) *Attorney, Agent, or Firm* — Holland & Hart LLP

(57) ABSTRACT

Methods, systems, and devices for data management are
described. A data management system may determine risk
levels for a plurality of computing objects. A risk level for
a computing object is determined based on a respective
quantity of elements comprising sensitive information
within the computing object and a respective quantity of
users with access to the computing object. The data man-
agement system may display the visualizations for a selected
subset of computing objects in a user interface. The visual-
izations for the computing objects may be positioned within
the user interface based on respective quantities of elements
comprising sensitive information within the computing
objects and further based on respective quantities of users
with access to the computing objects. The user interface may
be configured to receive a selection of a time period and
reposition the visualizations of the computing objects within
the user interface.

20 Claims, 9 Drawing Sheets

(56)               References Cited

U.S. PATENT DOCUMENTS

| | | | |
|---|---|---|---|
| D837,246 S | 1/2019 | Espeleta et al. | |
| D927,509 S | 8/2021 | Keegan et al. | |
| D961,605 S | 8/2022 | Starr et al. | |
| D962,263 S | 8/2022 | Takada et al. | |
| D964,387 S | 9/2022 | Takada et al. | |
| 11,575,696 B1 * | 2/2023 | Ithal | H04L 63/18 |
| D1,007,526 S | 12/2023 | Gossens et al. | |
| D1,059,389 S | 1/2025 | Liersch et al. | |
| D1,092,529 S | 9/2025 | Dalsania et al. | |
| D1,099,120 S | 10/2025 | Yajima et al. | |
| D1,099,121 S | 10/2025 | Yajima et al. | |
| D1,101,764 S | 11/2025 | Viitasalo | |
| D1,103,196 S | 11/2025 | Wonmeng et al. | |
| 2009/0276724 A1 * | 11/2009 | Rosenthal | G06F 16/248 |
| | | | 707/E17.108 |
| 2018/0218051 A1 | 8/2018 | Berger et al. | |
| 2018/0324056 A1 * | 11/2018 | Occhialini | H04L 41/5006 |
| 2019/0265870 A1 * | 8/2019 | Sheth | G06T 11/001 |
| 2023/0388352 A1 * | 11/2023 | Gilad | H04L 63/1416 |
| 2024/0386128 A1 | 11/2024 | Bhatia et al. | |

* cited by examiner

Figure 7:
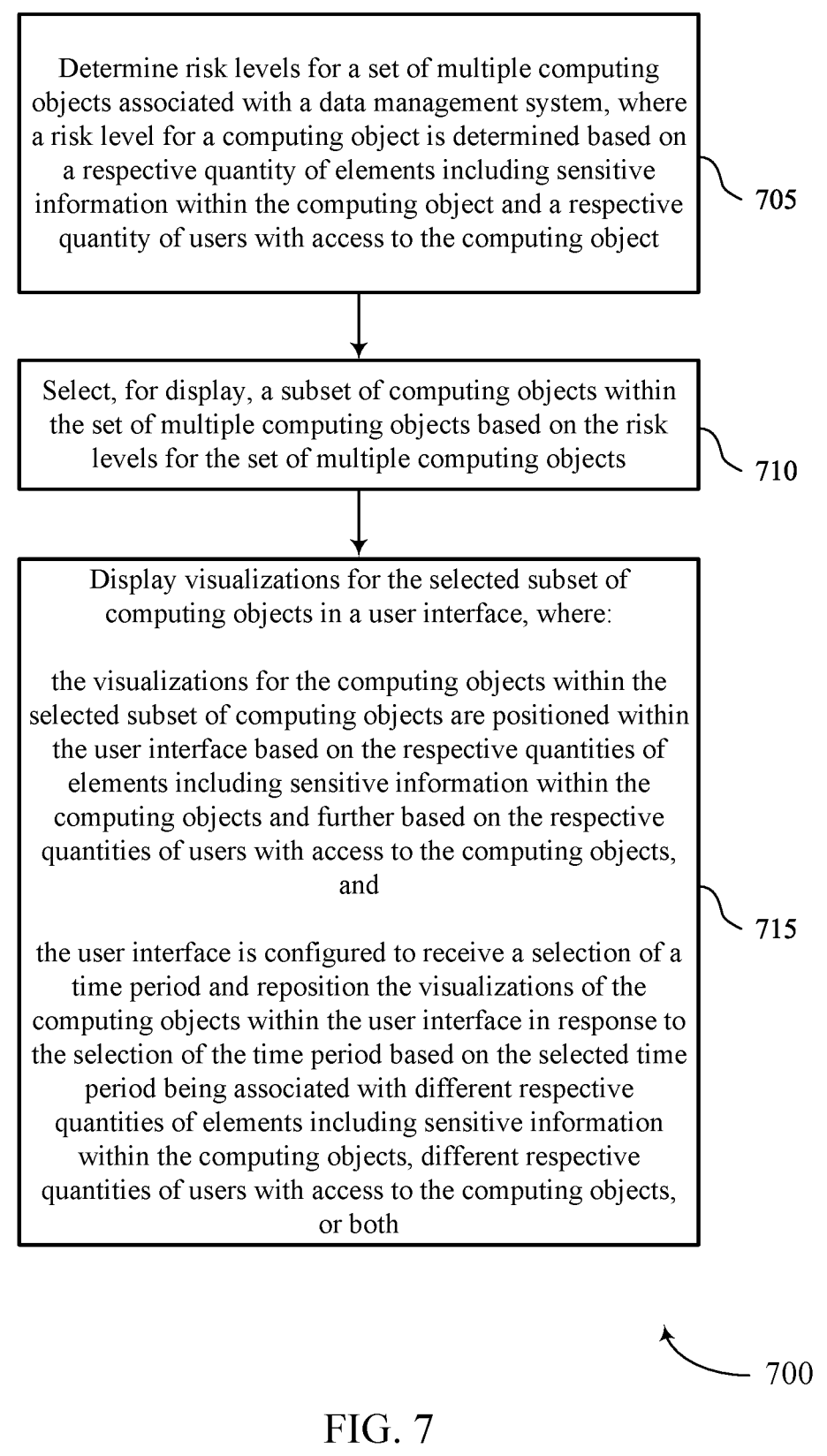

Determine risk levels for a set of multiple computing objects associated with a data management system, where a risk level for a computing object is determined based on a respective quantity of elements including sensitive information within the computing object and a respective quantity of users with access to the computing object

705

Select, for display, a subset of computing objects within the set of multiple computing objects based on the risk levels for the set of multiple computing objects

710

Display visualizations for the selected subset of computing objects in a user interface, where:

the visualizations for the computing objects within the selected subset of computing objects are positioned within the user interface based on the respective quantities of elements including sensitive information within the computing objects and further based on the respective quantities of users with access to the computing objects, and

715 the user interface is configured to receive a selection of a time period and reposition the visualizations of the computing objects within the user interface in response to the selection of the time period based on the selected time period being associated with different respective quantities of elements including sensitive information within the computing objects, different respective quantities of users with access to the computing objects, or both

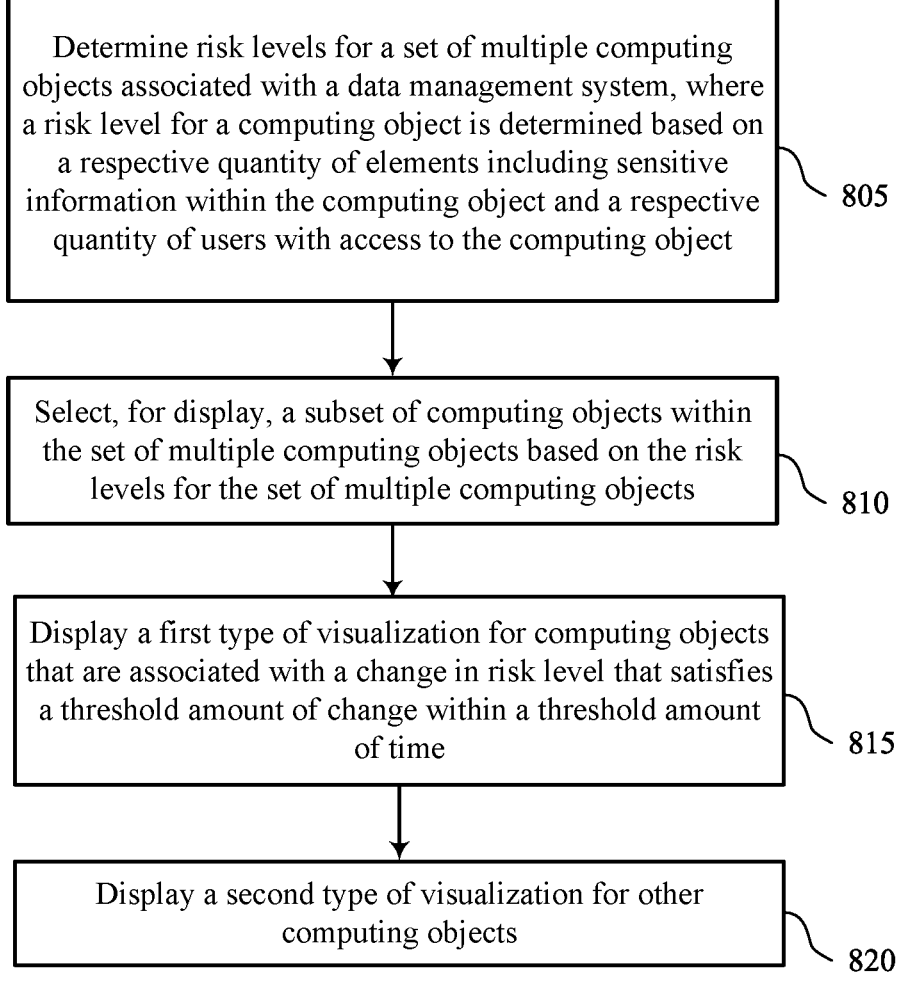

Determine risk levels for a set of multiple computing objects associated with a data management system, where a risk level for a computing object is determined based on a respective quantity of elements including sensitive information within the computing object and a respective quantity of users with access to the computing object

805

Select, for display, a subset of computing objects within the set of multiple computing objects based on the risk levels for the set of multiple computing objects

810

Display a first type of visualization for computing objects that are associated with a change in risk level that satisfies a threshold amount of change within a threshold amount of time

815

Display a second type of visualization for other computing objects

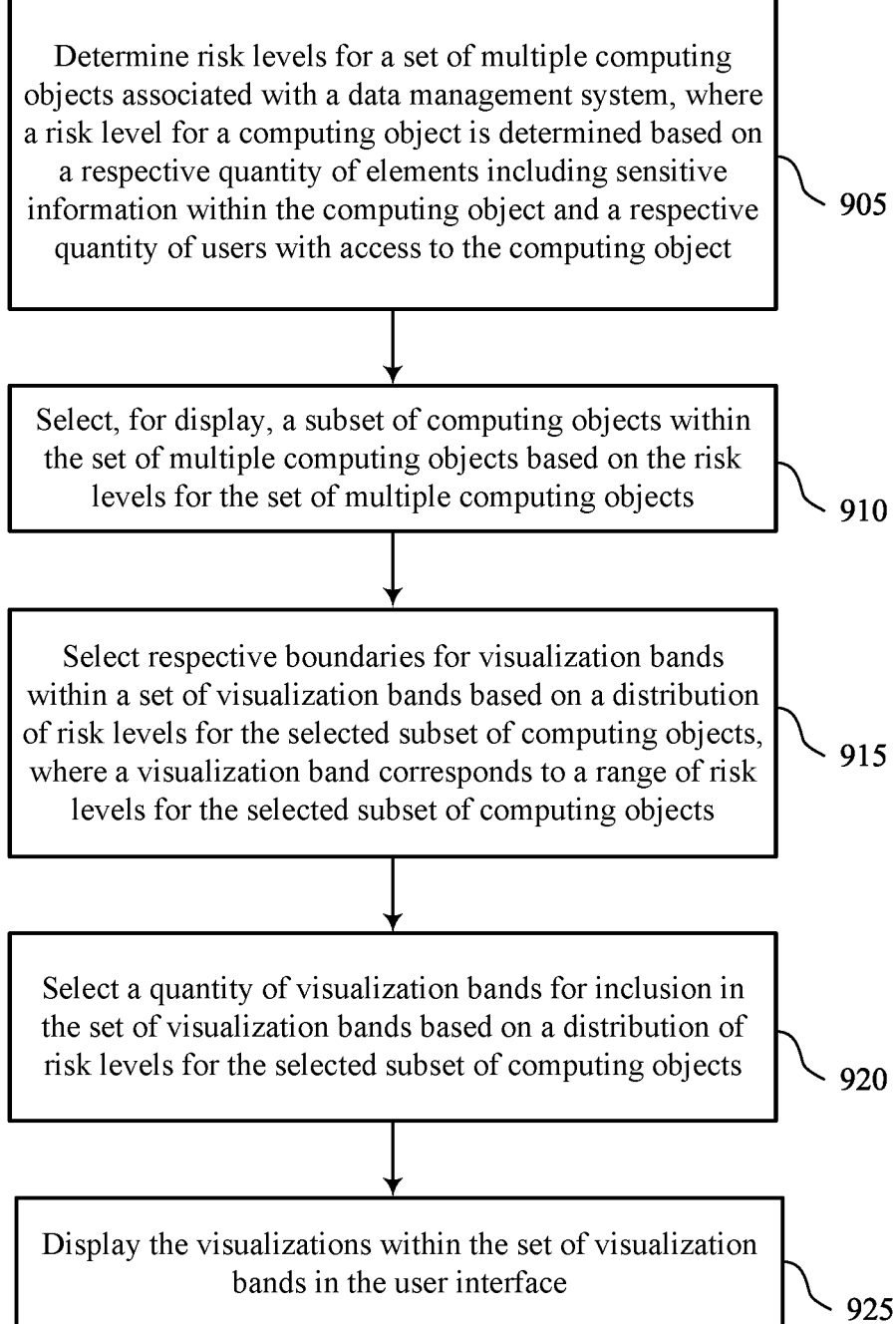

Determine risk levels for a set of multiple computing objects associated with a data management system, where a risk level for a computing object is determined based on a respective quantity of elements including sensitive information within the computing object and a respective quantity of users with access to the computing object

905

Select, for display, a subset of computing objects within the set of multiple computing objects based on the risk levels for the set of multiple computing objects

910

Select respective boundaries for visualization bands within a set of visualization bands based on a distribution of risk levels for the selected subset of computing objects, where a visualization band corresponds to a range of risk levels for the selected subset of computing objects

915

Select a quantity of visualization bands for inclusion in the set of visualization bands based on a distribution of risk levels for the selected subset of computing objects

920

Display the visualizations within the set of visualization bands in the user interface

IDENTIFICATION AND VISUALIZATION OF TOP-RISK OBJECTS

FIELD OF TECHNOLOGY

The present disclosure relates generally to data management, including techniques for identification and visualization of top-risk objects.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIGS. 7 through 9 show flowcharts illustrating methods that support identification and visualization of top-risk objects in accordance with aspects of the present disclosure.

DETAILED DESCRIPTION

Figure 1:
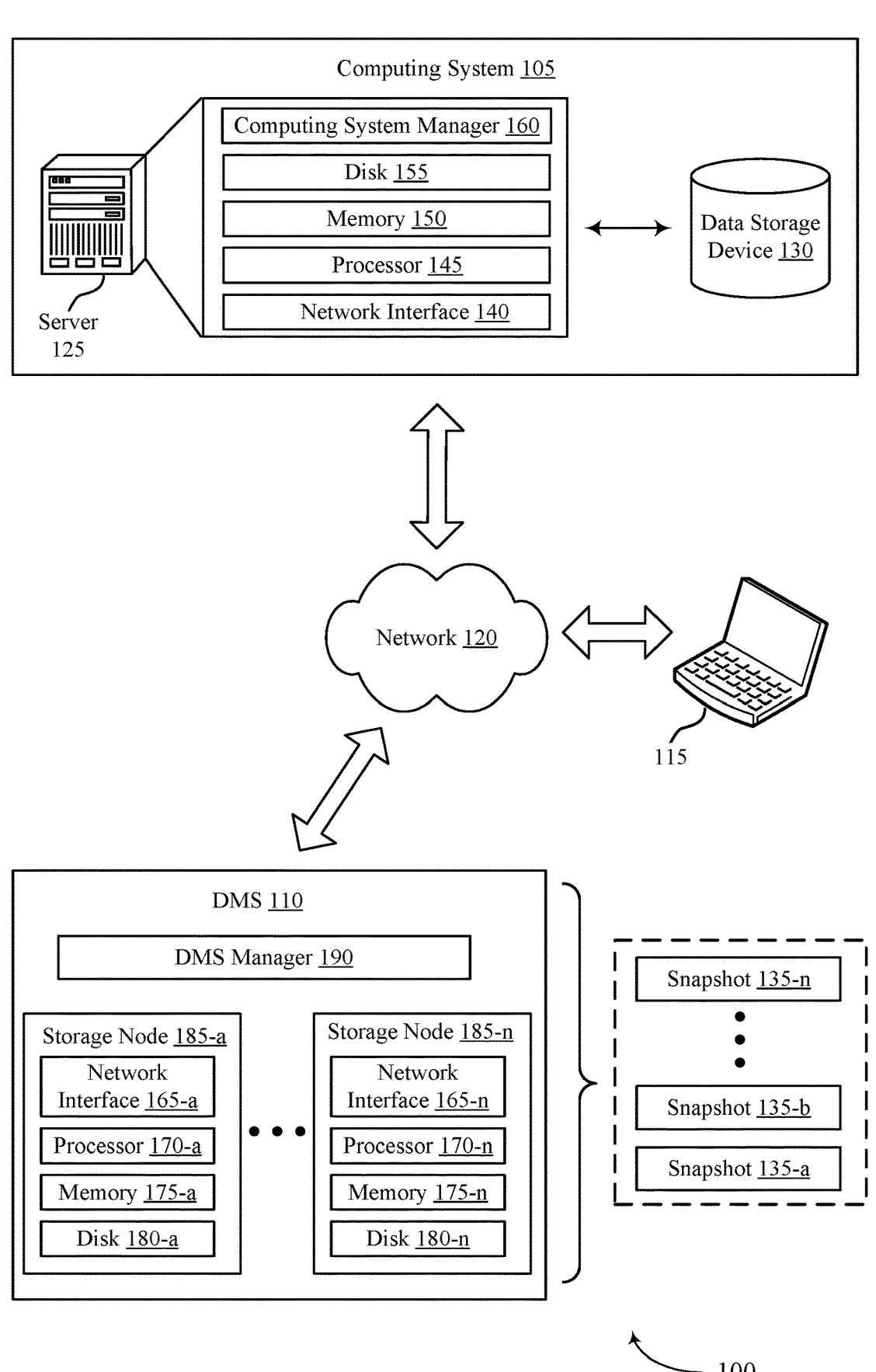
FIG. 1 illustrates an example of a computing environment that supports identification and visualization of top-risk objects in accordance with aspects of the present disclosure.

A data management system may support data backup and recovery services for data of a host environment. In some examples, the data management system may access databases, files, file systems, storage systems, virtual machines, filesets, volume groups, or the like to support such backup and recovery solutions. In some cases, the data management system may include a platform that a user may access to control backup and recovery for one or more host environments. For example, the platform may be used to configure or manage on-premises data backup and recovery systems, cloud based data backup and recovery systems, or both. Additionally, or alternatively, the platform may provide a dashboard that is used to visualize and maintain various aspects of the host environments as well as the corresponding backup and recovery solutions.

According to techniques described herein, a data management system may be configured to identify if or when a computing object includes sensitive information, such as personal identifiable information (PII), classified information, health information, or any combination thereof. For example, the data management system may be able to identify the presence of such information in order to comply with various laws and/or regulations. The data management system may also be configured to calculate risk levels for computing objects (e.g., categorize the computing objects into different corresponding risk levels) based on the presence of such sensitive information and a quantity of users that have access to the corresponding computing object (e.g., computing objects may be categorized into different corresponding risk levels such as low risk, medium risk, or high risk: or level 1 risk, level 2 risk, level 3 risk, level 4 risk, and so on-any quantity of risk levels is possible). Thus, as one of the metrics increases for a computing object (e.g., the quantity of elements of sensitive information in the computing object or the quantity of users with access to the computing object), the corresponding risk level may increase. In some examples, the platform that is used to manage backup and recovery solutions for computing objects may also display various metrics (e.g., in the dashboard) associated with the computing objects, and the metrics may include the risk levels for the computing objects.

To support improved assessment of relative risk for computing objects associated with a data management system, the data management system may be configured to display visualizations of computing objects in a user interface (UI), and the relative positions of the visualizations may be based on the risk level associated with the computing object. For example, the position of a visualization for a computing object along a y-axis of the UI may be based on the quantity of elements with sensitive information in the computing object and the position for the visualization along the x-axis may be based on the quantity of users that have access to the computing object. In some cases, the user may select a time period and the computing objects may be repositioned within the UI based on the changes of one or both of the quantity of elements of sensitive information or the quantity of users that have access to the computing object. Additionally, or alternatively, the visualization of a computing object may vary based on an increase in a risk level within a time period. As such, those objects that are associated with a large (e.g., greater than a threshold) increase in the risk level over an amount of time (e.g., the past week) may have a different visualization (e.g., different color, icon) than those objects that are not associated with the large increase in risk. Further, the UI may include dynamic or adjustable visualization bands that are associated with different distributions of risk levels and object visualizations with similar risk levels may be grouped within a same visualization band. As such, these techniques may support a user friendly and intuitive manner of illustrating risk associated with computing objects, such that administrative users may be able to perform techniques to mitigate or lower risk levels (e.g., by reducing information, reducing the quantity of users with access, encrypting information). These and other techniques are described in further detail with respect to the figures.

FIG. 1 illustrates an example of a computing environment 100 that supports identification and visualization of top-risk objects in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below:

To obtain a snapshot 135 of a target computing object associated with the computing system 105 (e.g., of the entirety of the computing system 105 or some portion thereof, such as one or more databases, one or more files, one or more file systems, one or more storage systems, one or more virtual machines, one or more filesets, one or more volume groups, or any combination thereof within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105.

And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

As described herein, the DMS 110 may provide data backup and recovery services to one or more host environments, such as data of the computing system 105. In some cases, a user may access a UI supported by or associated with the DMS 110 to configure and manage the backup and recovery services. For example, the user may access a UI of a platform that is used to manage backup and recovery services supported one or more DMSs, such as the DMS 110. The platform may also support a dashboard that the user may access to view backup and recovery progress, metrics, and the like. Additionally, the DMS 110 (or associated platform) may be configured to identify computing objects (e.g., databases, files, filesets) that include elements of sensitive information and to identify a quantity of users that have access to such computing objects. The DMS 110 may calculate a risk level for the computing object based on the quantity of users and the quantity of elements of sensitive information included in the computing object. In some cases, the DMS or the associated platform may calculate the risk level for multiple computing objects for which the DMS 110 performs backup and recovery services.

The platform may display (e.g., in the dashboard of the UI) visualizations for a least a subset of the computing objects, and the visualizations may be displayed within the UI based on the corresponding metrics, such as the quantity of sensitive hits (e.g., quantity of elements of sensitive information) within the corresponding computing object and the quantity of users that have access to the corresponding computing object. Additionally, the UI may be configured to reposition (e.g., move) the visualizations after selection of a time period by a user, where the time period corresponds to a different quantity of sensitive hits or a different quantity of users. Further, the UI may be configured to display different visualizations for computing objects that have a recent change in the corresponding risk level (e.g., above a threshold) in a time period (e.g., one week). As such, the DMS 110, platform, or UI may provide a robust technique for identification of relative risk associated with computing objects for which the DMS 110 provides data management services.

Figure 2:
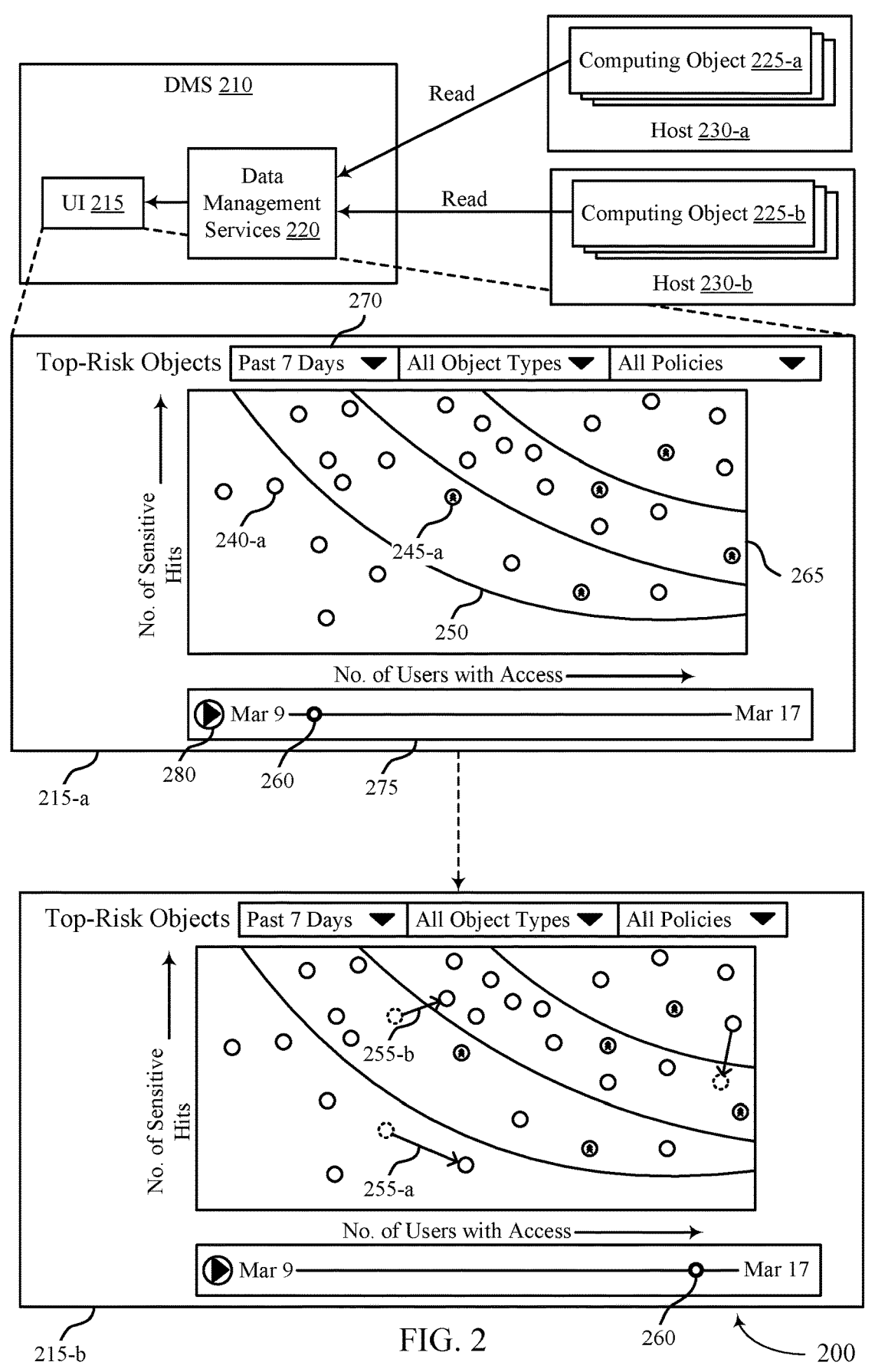
FIG. 2 shows an example of a computing environment that supports identification and visualization of top-risk objects in accordance with aspects of the present disclosure.

FIG. 2 shows an example of a computing environment 200 that supports identification and visualization of top-risk objects in accordance with aspects of the present disclosure. The computing environment 200 includes a DMS 210 and hosts 230. The DMS 210 may be an example of the DMS 110 of FIG. 1, and the hosts 230 may be examples of aspects of the computing system 105 of FIG. 1. The hosts 230 may include one or more servers that host data for various services, such as an application service, web service, database service, or the like. The hosts 230 may include one or more computing objects 225 that are used to access and store data. The computing objects 225 may be examples of databases, files, file systems, storage systems, or the like.

The DMS 210 may provide data management services 220 for the computing objects 225 of the hosts 230. For example, as described herein, the DMS 210 may be used to provide data backup (snapshot), recovery, and/or archival solutions for data of the computing objects 225-*a*. The DMS 210 may be accessed by an administrative user to configure data backup periodicity, backup retention periods, and other configuration parameters for the computing objects 225. Additionally, the DMS 210, or an associated system, may provide one or more UIs 215 that may be used to configure the backup and recovery parameters. The UI 215 may also provide a dashboard which the user may view to monitor data backup metrics.

The data management services 220 provided by the DMS 210 may also include risk assessment and analysis. That is, the DMS 210 may analyze host environments to identify exploits, viruses, software updates, etc. The DMS 210 may also analyze data of the computing objects 225 to identify sensitive information. For example, the DMS 210 may analyze snapshot data or the host data corresponding to the computing object 225 to identify whether the computing objects includes elements of sensitive information. An element of sensitive information may be an example of a piece of PII, such as a social security number. Thus, if a file includes three different social security numbers, then the file includes three elements of sensitive information. The DMS 210 may implement pattern matching, regular expression, pattern recognition, natural language processing, or similar techniques, to identify elements of sensitive information in a computing object 225. The DMS 210 may also be configured to identify a quantity of users that have access to a computing object 225. For example, the DMS 210 may analyze metadata (e.g., permission metadata) and/or read/ write requests to identify the quantity of users that have access to the computing object 225.

Using the quantity of sensitive hits and the quantity of users that have access to the metadata, the DMS 210 determine a relative risk level of a computing object 225. Additionally, the DMS 210 may monitor and document such metrics on a periodic basis such that the DMS 210 may monitor the risk levels, and changes thereof, over a period of time. The UI 215 may also display visualizations of the computing objects 225 based on the determined risk levels. For example, the DMS 210 may calculate the risk levels based on the respective quantity of users with access to the computing objects and the respective quantity of sensitive hits included in the computing objects and select the computing objects for display based on the risk levels. In some cases, the DMS 210 selects a threshold quantity of computing objects, a percentage of the computing objects, the computing objects with risk levels above a threshold, or the like, for display via at the UI 215. Thus, at least a subset of the computing objects 225 are selected for display based on the risk level.

As illustrated in UI 215-*a*, visualizations 240 corresponding to the selected subset of computing objects 225 are displayed in a chart 265 of the UI 215. Each visualization 240 is positioned within the chart 265 based on the corresponding quantity of sensitive hits (e.g., on the y-axis) and the corresponding quantity of users with access to the computing object (e.g., on the x-axis).

The UI 215 may also be configured to display visualization bands, as defined by boundaries including a boundary 250. The size/shape of the visualization bands and/or the boundaries may be determined by the DMS 210 based on the distribution of the visualizations (e.g., visualization 240) within the chart 265 based on the corresponding metrics. For example, the configurations of the visualization bands may be selected such that a percentage or portion of computing object visualizations are substantially equal or similar within each band. Additionally, or alternatively, the configurations for the visualization bands may be determined such that visualization with similar (e.g., within a range) are positioned within the same visualization band.

Moreover, the UI 215 may be configured to highlight visualizations corresponding to computing objects that have had a significant increase or change in a risk level. For example, visualization 245-*a* for a computing object includes a logo or highlight that is different from other visualizations (e.g., visualization 240)-a) such as to indicate that the corresponding computing object is associated with an increase in risk level that is greater than a threshold amount in an amount of time (e.g., past 7 days). The different visualization may include a different color, different icon, a flashing icon, a different shape, a different shading, or another type of indication.

The UI 215 may also support a user selecting the time period for filtering or selecting the computing objects for display via the visualizations. For example, the UI 215 may include UI components (e.g., UI component 270) that support selection of the time period, type of object, policies, etc. that are used to select or filter objects for display via the visualizations. Additionally, a user may access a UI component 275 of the UI 215 to select the display time within the time period. Thus, as illustrated in the UI 215-*a*, the time period is March 9 through March 17, and the current time (or date) is selected based on a position of a slider component 260. Thus, the position of the visualization 240 and 245 (and the visualization bands) may be configured by the UI 215 based on the current position of the slider component 260 and the corresponding metrics for the computing objects (e.g., the respective quantity of sensitive hits and the respective quantity of users with access) at the selected time/date.

The UI 215-*b* illustrates a different position of the slider component 260. As such, one or more of the visualizations may be repositioned within the chart 265 based on the differences in the corresponding metrics. Arrows 255 illustrated movements of visualizations based on differences in metrics corresponding to the computing objects. As such, the user may select different points within time periods to view respective positions of the visualizations. Additionally, the user may active a UI component 280 such that the slider component 260 moves within the time period and the visualizations corresponding to computing objects are moved or repositioned within the chart 265 based on corresponding metrics. As such, the chart 265 may effectively show changes in the risk levels based on changes in the current display time. Additionally, the visualization bands (or corresponding boundaries) may be modified based on the metric differences in the display times.

Accordingly, the DMS 210 may support an intuitive technique for selection of computing objects based on determined risk levels and display of visualization corresponding to the computing objects within an intuitive and user friendly UI. As a result, the user may be provided an overview of managed data objects such that the user may quickly identify and rectify computing objects with relatively high risk.

Figure 3:
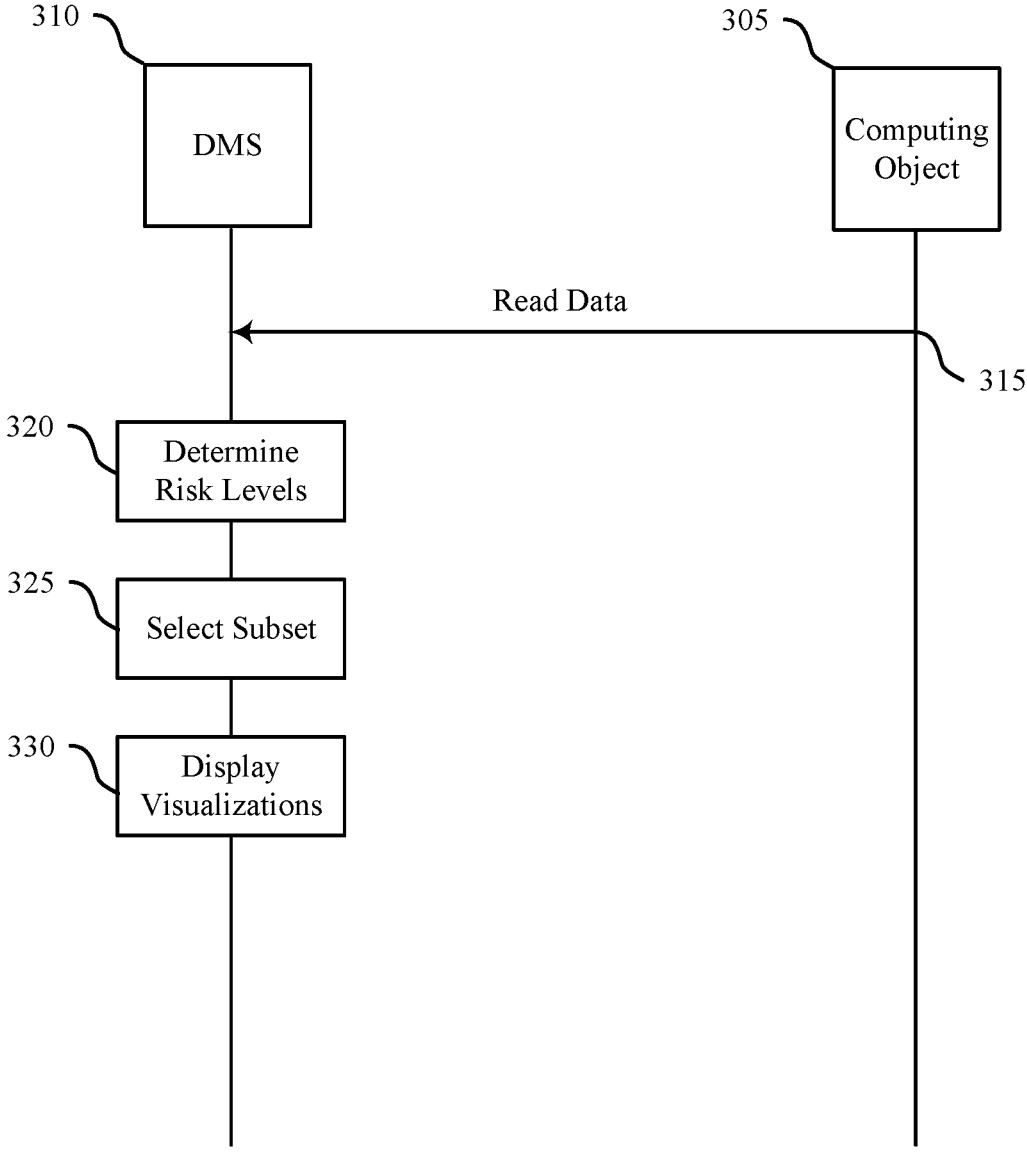
FIG. 3 shows an example of a process flow that supports identification and visualization of top-risk objects in accordance with aspects of the present disclosure.

FIG. 3 shows an example of a process flow 300 that supports identification and visualization of top-risk objects in accordance with aspects of the present disclosure. The process flow 300 includes a DMS 310 and a computing object 305. The DMS 310 may be an example of the DMS 110 of FIG. 1 or the DMS 210 of FIG. 2. The computing object 305 may be an example of the computing objects as described herein. For example, the computing object 305 may be an example of one or more databases, one or more files, one or more file systems, one or more storage systems, one or more virtual machines, one or more filesets, one or more volume groups, or any combination thereof. In the following description of the process flow 300, the operations between aspects of the process flow may be transmitted in a different order than the example order shown, or the operations performed may be performed in different orders or at different times. Some operations may also be omitted from the process flow 300, and other operations may be added to the process flow 300.

At 315, the DMS 310 may read data of the computing object 305. For example, the DMS 310 may read data of a host environment for a data backup procedure. In some examples, the DMS 310 reads data of multiple computing objects in one or more host environments as part of one or more backup procedures.

At 320, the DMS 310 may determine risk levels for a set of computing objects associated with the DMS 310. A risk level for the computing object 305 may be determined based at on a respective quantity of elements comprising sensitive information within the computing object 305 and a respective quantity of users with access to the computing object 305. Sensitive information may include PII, classified information, health information, or any combination thereof. The risk levels may include high, medium, and low risk levels.

At 325, the DMS 310 may select, for display, a subset of computing objects within the plurality of computing objects based on the risk levels for the plurality of computing objects. For example, the DMS 310 may select a percentage of the computing objects with the highest risk levels or a threshold quantity of computing objects. In some cases, the DMS 310 may select computing objects that are determined to high risk levels.

At 330, the DMS 310 may display visualizations for the selected subset of computing objects in a user interface. The visualizations for the computing objects within the selected subset of computing objects may be positioned within the user interface based on the respective quantities of elements comprising sensitive information within the computing objects and further based on the respective quantities of users with access to the computing objects: Further, the user interface is configured to receive a selection of a time period and reposition the visualizations of the computing objects within the user interface in response to the selection of the time period based on the selected time period being associated with different respective quantities of elements comprising sensitive information within the computing objects, different respective quantities of users with access to the computing objects, or both. In some examples, displaying the visualizations comprises displaying a first type of visualization for computing objects that are associated with a change in risk level that satisfies a threshold amount of change within a threshold amount of time and a second type of visualization for other computing objects. The first type of visualization comprises a different icon relative to the second type of visualization, a different color relative to the second type of visualization, a flashing icon, or any combination thereof.

Additionally, displaying the visualizations may include displaying the visualizations within a set of visualization bands in the user interface. A visualization band may correspond to a range of risk levels for the selected subset of computing objects. Different visualization bands within the set of visualization bands may include different colors, different shading patterns, or any combination thereof. In some examples, the DMS 110 may select respective boundaries for the visualization bands within the set of visualization bands based at least in part on a distribution of risk levels for the selected subset of computing objects or select a quantity of visualization bands for inclusion in the set of visualization bands based on a distribution of risk levels for the selected subset of computing objects. In some cases, the user interface is configured to reposition the set of visualization bands in response to the selection of the time period based on the selected time period being associated with the different respective quantities of elements comprising sensitive information within the computing objects, the different respective quantities of users with access to the computing objects, or both.

Figure 4:
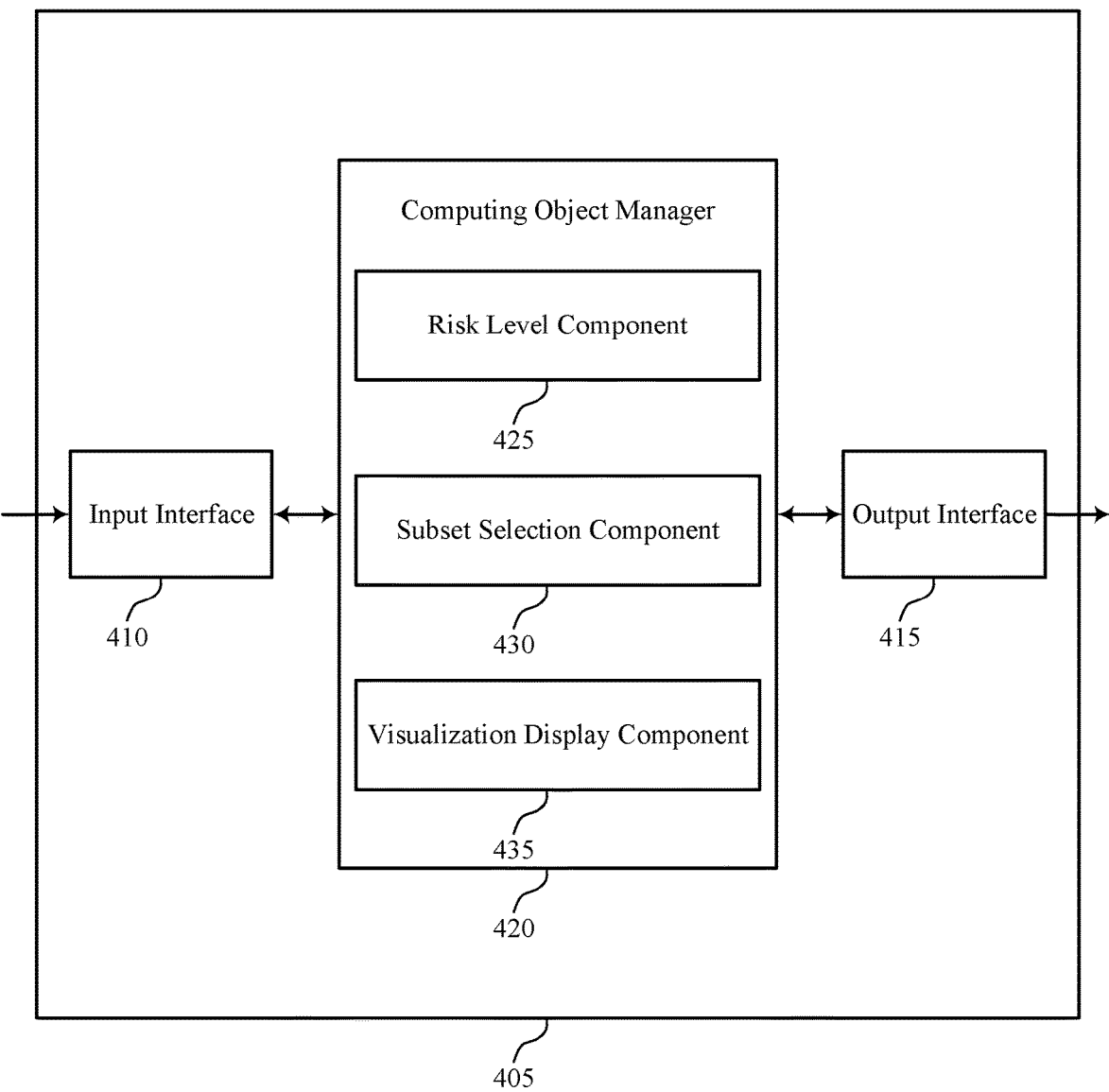
FIG. 4 shows a block diagram of an apparatus that supports identification and visualization of top-risk objects in accordance with aspects of the present disclosure.

FIG. 4 shows a block diagram 400 of a system 405 that supports identification and visualization of top-risk objects in accordance with aspects of the present disclosure. In some examples, the system 405 may be an example of aspects of one or more components described with reference to FIG. 1, such as a DMS 110. The system 405 may include an input interface 410, an output interface 415, and a computing object manager 420. The system 405 may also include one or more processors. Each of these components may be in communication with one another (e.g., via one or more buses, communications links, communications interfaces, or any combination thereof).

The input interface 410 may manage input signaling for the system 405. For example, the input interface 410 may receive input signaling (e.g., messages, packets, data, instructions, commands, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the computing object manager 420 to support identification and visualization of top-risk objects. In some cases, the input interface 410 may be a component of a network interface 625 as described with reference to FIG. 6.

The output interface 415 may manage output signaling for the system 405. For example, the output interface 415 may receive signaling from other components of the system 405, such as the computing object manager 420, and may transmit such output signaling corresponding to (e.g., representative of or otherwise based on) such signaling to other systems or devices. In some cases, the output interface 415 may be a component of a network interface 625 as described with reference to FIG. 6.

For example, the computing object manager 420 may include a risk level component 425, a subset selection component 430, a visualization display component 435, or any combination thereof. In some examples, the computing object manager 420, or various components thereof, may be configured to perform various operations (e.g., receiving, monitoring, transmitting) using or otherwise in cooperation with the input interface 410, the output interface 415, or both. For example, the computing object manager 420 may receive information from the input interface 410, send information to the output interface 415, or be integrated in combination with the input interface 410, the output interface 415, or both to receive information, transmit information, or perform various other operations as described herein.

The risk level component 425 may be configured as or otherwise support a means for determining risk levels for a set of multiple computing objects associated with a data management system, where a risk level for a computing object is determined based on a respective quantity of elements including sensitive information within the computing object and a respective quantity of users with access to the computing object. The subset selection component 430 may be configured as or otherwise support a means for selecting, for display, a subset of computing objects within the set of multiple computing objects based on the risk levels for the set of multiple computing objects. The visualization display component 435 may be configured as or otherwise support a means for displaying visualizations for the selected subset of computing objects in a user interface, where the visualizations for the computing objects within the selected subset of computing objects are positioned within the user interface based on the respective quantities of elements including sensitive information within the computing objects and further based on the respective quantities of users with access to the computing objects, and the user interface is configured to receive a selection of a time period and reposition the visualizations of the computing objects within the user interface in response to the selection of the time period based on the selected time period being associated with different respective quantities of elements including sensitive information within the computing objects, different respective quantities of users with access to the computing objects, or both.

Figure 5:
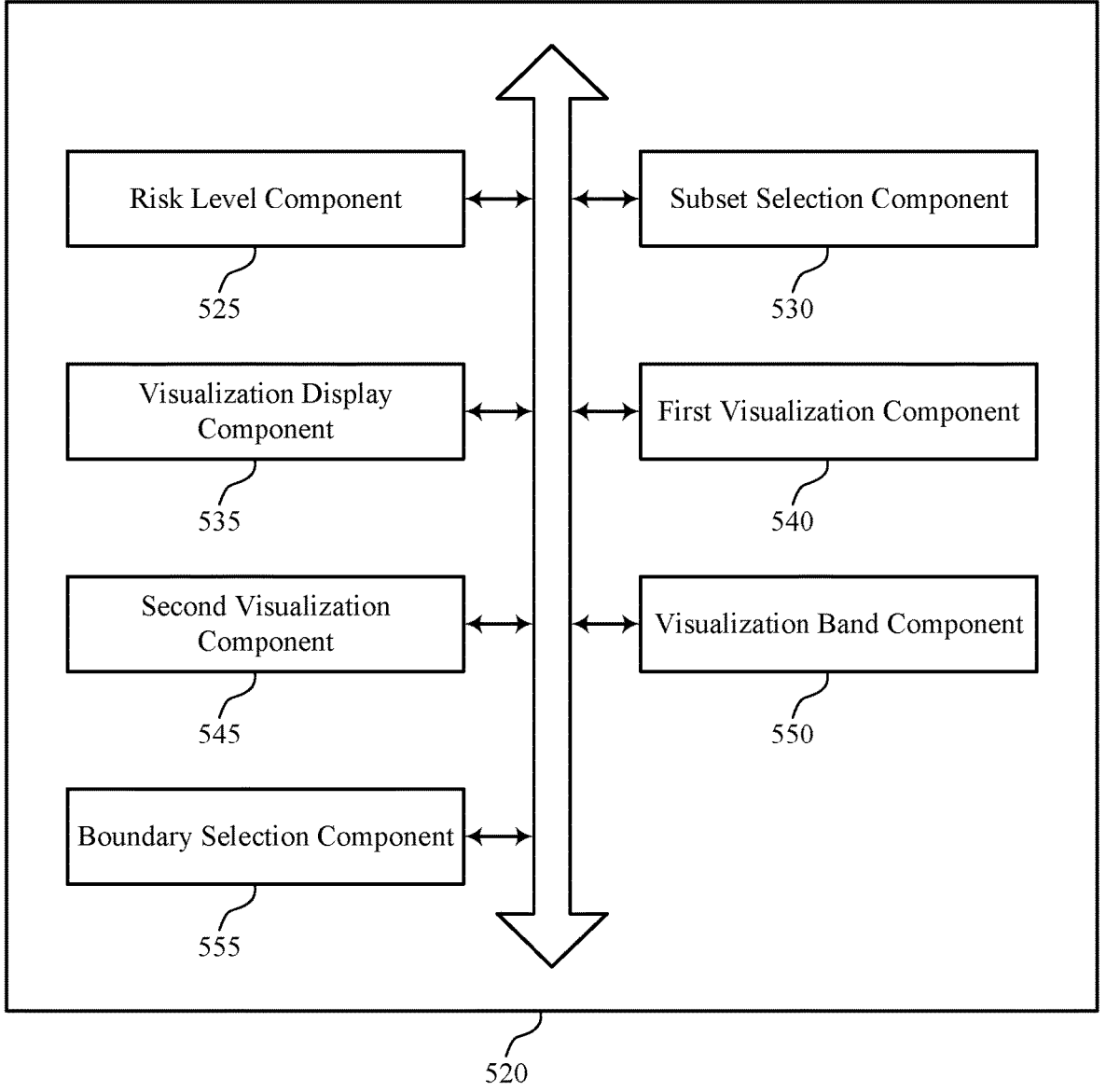
FIG. 5 shows a block diagram of a computing object manager that supports identification and visualization of top-risk objects in accordance with aspects of the present disclosure.

FIG. 5 shows a block diagram 500 of a computing object manager 520 that supports identification and visualization of top-risk objects in accordance with aspects of the present disclosure. The computing object manager 520 may be an example of aspects of a computing object manager or a computing object manager 420, or both, as described herein. The computing object manager 520, or various components thereof, may be an example of means for performing various aspects of identification and visualization of top-risk objects as described herein. For example, the computing object manager 520 may include a risk level component 525, a subset selection component 530, a visualization display component 535, a first visualization component 540, a second visualization component 545, a visualization band component 550, a boundary selection component 555, or any combination thereof. Each of these components may communicate, directly or indirectly, with one another (e.g., via one or more buses, communications links, communications interfaces, or any combination thereof).

The risk level component 525 may be configured as or otherwise support a means for determining risk levels for a set of multiple computing objects associated with a data management system, where a risk level for a computing object is determined based on a respective quantity of elements including sensitive information within the computing object and a respective quantity of users with access to the computing object. The subset selection component 530 may be configured as or otherwise support a means for selecting, for display, a subset of computing objects within the set of multiple computing objects based on the risk levels for the set of multiple computing objects. The visualization display component 535 may be configured as or otherwise support a means for displaying visualizations for the selected subset of computing objects in a user interface, where the visualizations for the computing objects within the selected subset of computing objects are positioned within the user interface based on the respective quantities of elements including sensitive information within the computing objects and further based on the respective quantities of users with access to the computing objects, and the user interface is configured to receive a selection of a time period and reposition the visualizations of the computing objects within the user interface in response to the selection of the time period based on the selected time period being associated with different respective quantities of elements including sensitive information within the computing objects, different respective quantities of users with access to the computing objects, or both.

In some examples, to support displaying the visualizations, the first visualization component 540 may be configured as or otherwise support a means for displaying a first type of visualization for computing objects that are associated with a change in risk level that satisfies a threshold amount of change within a threshold amount of time. In some examples, to support displaying the visualizations, the second visualization component 545 may be configured as or otherwise support a means for displaying a second type of visualization for other computing objects.

In some examples, the first type of visualization includes a different icon relative to the second type of visualization, a different color relative to the second type of visualization, a flashing icon, or any combination thereof.

In some examples, to support displaying the visualizations, the visualization band component 550 may be configured as or otherwise support a means for displaying the visualizations within a set of visualization bands in the user interface, where a visualization band corresponds to a range of risk levels for the selected subset of computing objects.

In some examples, different visualization bands within the set of visualization bands include different colors, different shading patterns, or any combination thereof.

In some examples, the boundary selection component 555 may be configured as or otherwise support a means for selecting respective boundaries for the visualization bands within the set of visualization bands based on a distribution of risk levels for the selected subset of computing objects.

In some examples, the visualization band component 550 may be configured as or otherwise support a means for selecting a quantity of visualization bands for inclusion in the set of visualization bands based on a distribution of risk levels for the selected subset of computing objects.

In some examples, the user interface is configured to reposition the set of visualization bands in response to the selection of the time period based on the selected time period being associated with the different respective quantities of elements including sensitive information within the computing objects, the different respective quantities of users with access to the computing objects, or both.

In some examples, the set of multiple computing objects includes one or more databases, one or more files, one or more file systems, one or more storage systems, one or more virtual machines, one or more filesets, one or more volume groups, or any combination thereof.

In some examples, the sensitive information includes personal identifiable information (PII), classified information, health information, or any combination thereof.

Figure 6:
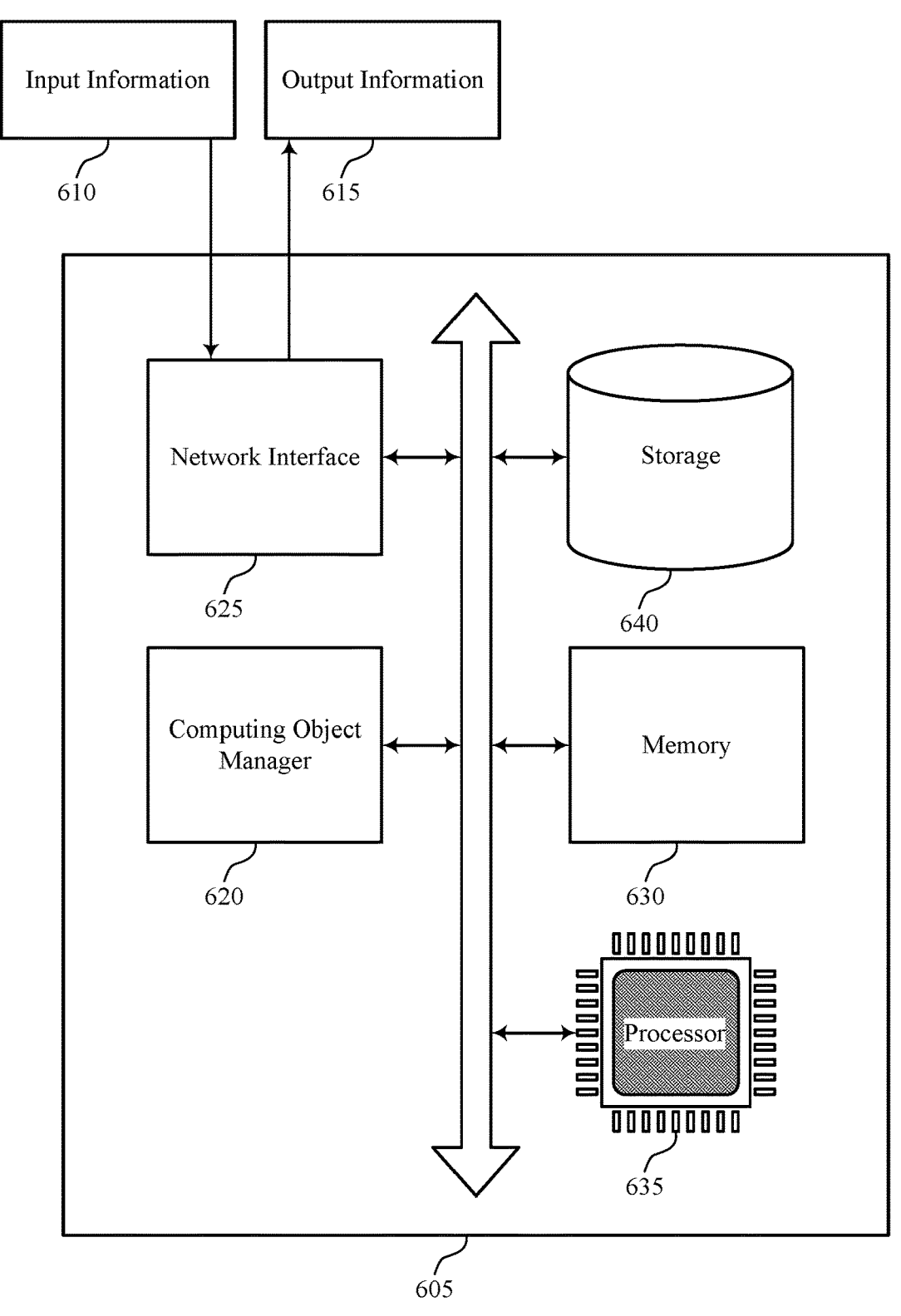
FIG. 6 shows a diagram of a system including a device that supports identification and visualization of top-risk objects in accordance with aspects of the present disclosure.

FIG. 6 shows a block diagram 600 of a system 605 that supports identification and visualization of top-risk objects in accordance with aspects of the present disclosure. The system 605 may be an example of or include the components of a system 405 as described herein. The system 605 may include components for data management, including components such as a computing object manager 620, an input information 610, an output information 615, a network interface 625, a memory 630, a processor 635, and a storage

640. These components may be in electronic communication or otherwise coupled with each other (e.g., operatively, communicatively, functionally, electronically, electrically: via one or more buses, communications links, communications interfaces, or any combination thereof). Additionally, the components of the system 605 may include corresponding physical components or may be implemented as corresponding virtual components (e.g., components of one or more virtual machines). In some examples, the system 605 may be an example of aspects of one or more components described with reference to FIG. 1, such as a DMS 110.

The network interface 625 may enable the system 605 to exchange information (e.g., input information 610, output information 615, or both) with other systems or devices (not shown). For example, the network interface 625 may enable the system 605 to connect to a network (e.g., a network 120 as described herein). The network interface 625 may include one or more wireless network interfaces, one or more wired network interfaces, or any combination thereof. In some examples, the network interface 625 may be an example of may be an example of aspects of one or more components described with reference to FIG. 1, such as one or more network interfaces 165.

Memory 630 may include RAM, ROM, or both. The memory 630 may store computer-readable, computer-executable software including instructions that, when executed, cause the processor 635 to perform various functions described herein. In some cases, the memory 630 may contain, among other things, a basic input/output system (BIOS), which may control basic hardware or software operation such as the interaction with peripheral components or devices. In some cases, the memory 630 may be an example of aspects of one or more components described with reference to FIG. 1, such as one or more memories 175.

The processor 635 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 635 may be configured to execute computer-readable instructions stored in a memory 630 to perform various functions (e.g., functions or tasks supporting identification and visualization of top-risk objects). Though a single processor 635 is depicted in the example of FIG. 6, it is to be understood that the system 605 may include any quantity of one or more of processors 635 and that a group of processors 635 may collectively perform one or more functions ascribed herein to a processor, such as the processor 635. In some cases, the processor 635 may be an example of aspects of one or more components described with reference to FIG. 1, such as one or more processors 170.

Storage 640 may be configured to store data that is generated, processed, stored, or otherwise used by the system 605. In some cases, the storage 640 may include one or more HDDs, one or more SDDs, or both. In some examples, the storage 640 may be an example of a single database, a distributed database, multiple distributed databases, a data store, a data lake, or an emergency backup database. In some examples, the storage 640 may be an example of one or more components described with reference to FIG. 1, such as one or more network disks 180.

For example, the computing object manager 620 may be configured as or otherwise support a means for determining risk levels for a set of multiple computing objects associated with a data management system, where a risk level for a computing object is determined based on a respective quantity of elements including sensitive information within the computing object and a respective quantity of users with access to the computing object. The computing object manager 620 may be configured as or otherwise support a means for selecting, for display, a subset of computing objects within the set of multiple computing objects based on the risk levels for the set of multiple computing objects. The computing object manager 620 may be configured as or otherwise support a means for displaying visualizations for the selected subset of computing objects in a user interface, where the visualizations for the computing objects within the selected subset of computing objects are positioned within the user interface based on the respective quantities of elements including sensitive information within the computing objects and further based on the respective quantities of users with access to the computing objects, and the user interface is configured to receive a selection of a time period and reposition the visualizations of the computing objects within the user interface in response to the selection of the time period based on the selected time period being associated with different respective quantities of elements including sensitive information within the computing objects, different respective quantities of users with access to the computing objects, or both.

By including or configuring the computing object manager 620 in accordance with examples as described herein, the system 605 may support techniques for identification and visualization of top-risk objects, which may provide one or more benefits such as, for example, improved user experience related to identification of computing objects associated with high risk levels based on determined quantity of sensitive hits and the quantity of users with access to the computing objects, among other possibilities.

FIG. 7 shows a flowchart illustrating a method 700 that supports identification and visualization of top-risk objects in accordance with aspects of the present disclosure. The operations of the method 700 may be implemented by a DMS or its components as described herein. For example, the operations of the method 700 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 705, the method may include determining risk levels for a set of multiple computing objects associated with a data management system, where a risk level for a computing object is determined based on a respective quantity of elements including sensitive information within the computing object and a respective quantity of users with access to the computing object. The operations of block 705 may be performed in accordance with examples as disclosed herein. In some examples, aspects of the operations of 705 may be performed by a risk level component 525 as described with reference to FIG. 5.

At 710, the method may include selecting, for display, a subset of computing objects within the set of multiple computing objects based on the risk levels for the set of multiple computing objects. The operations of block 710 may be performed in accordance with examples as disclosed herein. In some examples, aspects of the operations of 710 may be performed by a subset selection component 530 as described with reference to FIG. 5.

At 715, the method may include displaying visualizations for the selected subset of computing objects in a user interface, where the visualizations for the computing objects within the selected subset of computing objects are positioned within the user interface based on the respective quantities of elements including sensitive information within the computing objects and further based on the respective quantities of users with access to the computing objects, and the user interface is configured to receive a selection of a time period and reposition the visualizations of the computing objects within the user interface in response to the selection of the time period based on the selected time period being associated with different respective quantities of elements including sensitive information within the computing objects, different respective quantities of users with access to the computing objects, or both. The operations of block 715 may be performed in accordance with examples as disclosed herein. In some examples, aspects of the operations of 715 may be performed by a visualization display component 535 as described with reference to FIG. 5.

FIG. 8 shows a flowchart illustrating a method 800 that supports identification and visualization of top-risk objects in accordance with aspects of the present disclosure. The operations of the method 800 may be implemented by a DMS or its components as described herein. For example, the operations of the method 800 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 805, the method may include determining risk levels for a set of multiple computing objects associated with a data management system, where a risk level for a computing object is determined based on a respective quantity of elements including sensitive information within the computing object and a respective quantity of users with access to the computing object. The operations of block 805 may be performed in accordance with examples as disclosed herein. In some examples, aspects of the operations of 805 may be performed by a risk level component 525 as described with reference to FIG. 5.

At 810, the method may include selecting, for display, a subset of computing objects within the set of multiple computing objects based on the risk levels for the set of multiple computing objects. The operations of block 810 may be performed in accordance with examples as disclosed herein. In some examples, aspects of the operations of 810 may be performed by a subset selection component 530 as described with reference to FIG. 5.

At 815, the method may include displaying a first type of visualization for computing objects that are associated with a change in risk level that satisfies a threshold amount of change within a threshold amount of time. The operations of block 815 may be performed in accordance with examples as disclosed herein. In some examples, aspects of the operations of 815 may be performed by a first visualization component 540 as described with reference to FIG. 5.

At 820, the method may include displaying a second type of visualization for other computing objects. The operations of block 820 may be performed in accordance with examples as disclosed herein. In some examples, aspects of the operations of 820 may be performed by a second visualization component 545 as described with reference to FIG. 5.

FIG. 9 shows a flowchart illustrating a method 900 that supports identification and visualization of top-risk objects in accordance with aspects of the present disclosure. The operations of the method 900 may be implemented by a DMS or its components as described herein. For example, the operations of the method 900 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 905, the method may include determining risk levels for a set of multiple computing objects associated with a data management system, where a risk level for a computing object is determined based on a respective quantity of elements including sensitive information within the computing object and a respective quantity of users with access to the computing object. The operations of block 905 may be performed in accordance with examples as disclosed herein. In some examples, aspects of the operations of 905 may be performed by a risk level component 525 as described with reference to FIG. 5.

At 910, the method may include selecting, for display, a subset of computing objects within the set of multiple computing objects based on the risk levels for the set of multiple computing objects. The operations of block 910 may be performed in accordance with examples as disclosed herein. In some examples, aspects of the operations of 910 may be performed by a subset selection component 530 as described with reference to FIG. 5.

At 915, the method may include selecting respective boundaries for visualization bands within a of visualization bands based on a distribution of risk levels for the selected subset of computing objects, where a visualization band corresponds to a range of risk levels for the selected subset of computing objects. The operations of block 915 may be performed in accordance with examples as disclosed herein. In some examples, aspects of the operations of 915 may be performed by a boundary selection component 555 as described with reference to FIG. 5.

At 920, the method may include selecting a quantity of visualization bands for inclusion in the set of visualization bands based on a distribution of risk levels for the selected subset of computing objects. The operations of block 920 may be performed in accordance with examples as disclosed herein. In some examples, aspects of the operations of 920 may be performed by a visualization band component 550 as described with reference to FIG. 5.

At 925, the method may include displaying the visualizations within the set of visualization bands in the user interface. The operations of block 925 may be performed in accordance with examples as disclosed herein. In some examples, aspects of the operations of 925 may be performed by a visualization band component 550 as described with reference to FIG. 5.

A method is described. The method may include determining risk levels for a set of multiple computing objects associated with a data management system, where a risk level for a computing object is determined based on a respective quantity of elements including sensitive information within the computing object and a respective quantity of users with access to the computing object, selecting, for display, a subset of computing objects within the set of multiple computing objects based on the risk levels for the set of multiple computing objects, and displaying visualizations for the selected subset of computing objects in a user interface, where the visualizations for the computing objects within the selected subset of computing objects are positioned within the user interface based on the respective quantities of elements including sensitive information within the computing objects and further based on the respective quantities of users with access to the computing objects, and the user interface is configured to receive a selection of a time period and reposition the visualizations of the computing objects within the user interface in response to the selection of the time period based on the selected time period being associated with different respective quantities of elements including sensitive information within the computing objects, different respective quantities of users with access to the computing objects, or both.

An apparatus is described. The apparatus may include a processor, memory coupled with the processor, and instructions stored in the memory. The instructions may be executable by the processor to cause the apparatus to determine risk levels for a set of multiple computing objects associated with a data management system, where a risk level for a computing object is determined based on a respective quantity of elements including sensitive information within the computing object and a respective quantity of users with access to the computing object, select, for display, a subset of computing objects within the set of multiple computing objects based on the risk levels for the set of multiple computing objects, and display visualizations for the selected subset of computing objects in a user interface, where the visualizations for the computing objects within the selected subset of computing objects are positioned within the user interface based on the respective quantities of elements including sensitive information within the computing objects and further based on the respective quantities of users with access to the computing objects, and the user interface is configured to receive a selection of a time period and reposition the visualizations of the computing objects within the user interface in response to the selection of the time period based on the selected time period being associated with different respective quantities of elements including sensitive information within the computing objects, different respective quantities of users with access to the computing objects, or both.

Another apparatus is described. The apparatus may include means for determining risk levels for a set of multiple computing objects associated with a data management system, where a risk level for a computing object is determined based on a respective quantity of elements including sensitive information within the computing object and a respective quantity of users with access to the computing object, means for selecting, for display, a subset of computing objects within the set of multiple computing objects based on the risk levels for the set of multiple computing objects, and means for displaying visualizations for the selected subset of computing objects in a user interface, where the visualizations for the computing objects within the selected subset of computing objects are positioned within the user interface based on the respective quantities of elements including sensitive information within the computing objects and further based on the respective quantities of users with access to the computing objects, and the user interface is configured to receive a selection of a time period and reposition the visualizations of the computing objects within the user interface in response to the selection of the time period based on the selected time period being associated with different respective quantities of elements including sensitive information within the computing objects, different respective quantities of users with access to the computing objects, or both.

A non-transitory computer-readable medium storing code is described. The code may include instructions executable by a processor to determine risk levels for a set of multiple computing objects associated with a data management system, where a risk level for a computing object is determined based on a respective quantity of elements including sensitive information within the computing object and a respective quantity of users with access to the computing object, select, for display, a subset of computing objects within the set of multiple computing objects based on the risk levels for the set of multiple computing objects, and display visualizations for the selected subset of computing objects in a user interface, where the visualizations for the computing objects within the selected subset of computing objects are positioned within the user interface based on the respective quantities of elements including sensitive information within the computing objects and further based on the respective quantities of users with access to the computing objects, and the user interface is configured to receive a selection of a time period and reposition the visualizations of the computing objects within the user interface in response to the selection of the time period based on the selected time period being associated with different respective quantities of elements including sensitive information within the computing objects, different respective quantities of users with access to the computing objects, or both.

In some examples of the method, apparatuses, and non-transitory computer-readable medium described herein, displaying the visualizations may include operations, features, means, or instructions for displaying a first type of visualization for computing objects that may be associated with a change in risk level that satisfies a threshold amount of change within a threshold amount of time and displaying a second type of visualization for other computing objects.

In some examples of the method, apparatuses, and non-transitory computer-readable medium described herein, the first type of visualization includes a different icon relative to the second type of visualization, a different color relative to the second type of visualization, a flashing icon, or any combination thereof.

In some examples of the method, apparatuses, and non-transitory computer-readable medium described herein, displaying the visualizations may include operations, features, means, or instructions for displaying the visualizations within a set of visualization bands in the user interface, where a visualization band corresponds to a range of risk levels for the selected subset of computing objects.

In some examples of the method, apparatuses, and non-transitory computer-readable medium described herein, different visualization bands within the set of visualization bands include different colors, different shading patterns, or any combination thereof.

Some examples of the method, apparatuses, and non-transitory computer-readable medium described herein may further include operations, features, means, or instructions for selecting respective boundaries for the visualization bands within the set of visualization bands based on a distribution of risk levels for the selected subset of computing objects.

Some examples of the method, apparatuses, and non-transitory computer-readable medium described herein may further include operations, features, means, or instructions for selecting a quantity of visualization bands for inclusion in the set of visualization bands based on a distribution of risk levels for the selected subset of computing objects.

In some examples of the method, apparatuses, and non-transitory computer-readable medium described herein, the user interface may be configured to reposition the set of visualization bands in response to the selection of the time period based on the selected time period being associated with the different respective quantities of elements including sensitive information within the computing objects, the different respective quantities of users with access to the computing objects, or both.

In some examples of the method, apparatuses, and non-transitory computer-readable medium described herein, the set of multiple computing objects includes one or more databases, one or more files, one or more file systems, one or more storage systems, one or more virtual machines, one or more filesets, one or more volume groups, or any combination thereof.

In some examples of the method, apparatuses, and non-transitory computer-readable medium described herein, the sensitive information includes personal identifiable information (PII), classified information, health information, or any combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method of data management, comprising:
determining risk levels for a plurality of computing objects associated with a data management system, wherein a risk level for a computing object is determined based at least in part on a respective quantity of elements comprising sensitive information within the computing object and a respective quantity of users with access to the computing object;
selecting, for display, a subset of computing objects within the plurality of computing objects based on the risk levels for the plurality of computing objects; and
displaying visualizations for the selected subset of computing objects in a user interface, wherein:
the visualizations for the computing objects within the selected subset of computing objects are positioned along an x-axis within the user interface based at least in part on a first metric from a set of metrics and are positioned along a y-axis within the user interface based at least in part on a second metric from the set of metrics, wherein:
the set of metrics comprises the respective quantities of elements comprising sensitive information within the computing objects, and
the set of metrics further comprises the respective quantities of users with access to the computing objects, and
the user interface is configured to receive a selection of a time period and reposition the visualizations for the computing objects along the x-axis, the y-axis, or both within the user interface in response to the selection of the time period based at least in part on the selected time period being associated with different respective quantities of elements comprising sensitive information within the computing objects, different respective quantities of users with access to the computing objects, or both.

2. The method of claim 1, wherein displaying the visualizations comprises:
displaying a first type of visualization for computing objects that are associated with a change in risk level that satisfies a threshold amount of change within a threshold amount of time; and
displaying a second type of visualization for other computing objects.

3. The method of claim 2, wherein the first type of visualization comprises a different icon relative to the second type of visualization, a different color relative to the second type of visualization, a flashing icon, or any combination thereof.

4. The method of claim 1, wherein displaying the visualizations comprises:
displaying the visualizations within a set of visualization bands in the user interface, wherein a visualization band corresponds to a range of risk levels for the selected subset of computing objects.

5. The method of claim 4, wherein different visualization bands within the set of visualization bands comprise different colors, different shading patterns, or any combination thereof.

6. The method of claim 4, further comprising:
selecting respective boundaries for visualization bands within the set of visualization bands based at least in part on a distribution of risk levels for the selected subset of computing objects.

7. The method of claim 4, further comprising:

selecting a quantity of visualization bands for inclusion in the set of visualization bands based at least in part on a distribution of risk levels for the selected subset of computing objects.

8. The method of claim 4, wherein the user interface is configured to reposition the set of visualization bands in response to the selection of the time period based at least in part on the selected time period being associated with the different respective quantities of elements comprising sensitive information within the computing objects, the different respective quantities of users with access to the computing objects, or both.

9. The method of claim 1, wherein the plurality of computing objects comprises one or more databases, one or more files, one or more file systems, one or more storage systems, one or more virtual machines, one or more filesets, one or more volume groups, or any combination thereof.

10. The method of claim 1, wherein the sensitive information comprises personal identifiable information (PII), classified information, health information, or any combination thereof.

11. An apparatus, comprising:

a processor;

memory coupled with the processor; and instructions stored in the memory and executable by the processor to cause the apparatus to:

determine risk levels for a plurality of computing objects associated with a data management system, wherein a risk level for a computing object is determined based at least in part on a respective quantity of elements comprising sensitive information within the computing object and a respective quantity of users with access to the computing object;

select, for display, a subset of computing objects within the plurality of computing objects based on the risk levels for the plurality of computing objects; and display visualizations for the selected subset of computing objects in a user interface, wherein:

the visualizations for the computing objects within the selected subset of computing objects are positioned along an x-axis within the user interface based at least in part on a first metric from a set of metrics and are positioned along a y-axis within the user interface based at least in part on a second metric from the set of metrics, wherein:

the set of metrics comprises the respective quantities of elements comprising sensitive information within the computing objects, and the set of metrics further comprises the respective quantities of users with access to the computing objects, and the user interface is configured to receive a selection of a time period and reposition the visualizations for the computing objects along the x-axis, the y-axis, or both within the user interface in response to the selection of the time period based at least in part on the selected time period being associated with different respective quantities of elements comprising sensitive information within the computing objects, different respective quantities of users with access to the computing objects, or both.

12. The apparatus of claim 11, wherein, to display the visualizations, the instructions are executable by the processor to cause the apparatus to:

display a first type of visualization for computing objects that are associated with a change in risk level that satisfies a threshold amount of change within a threshold amount of time; and display a second type of visualization for other computing objects.

13. The apparatus of claim 12, wherein the first type of visualization comprises a different icon relative to the second type of visualization, a different color relative to the second type of visualization, a flashing icon, or any combination thereof.

14. The apparatus of claim 11, wherein, to display the visualizations, the instructions are executable by the processor to cause the apparatus to:

display the visualizations within a set of visualization bands in the user interface, wherein a visualization band corresponds to a range of risk levels for the selected subset of computing objects.

15. The apparatus of claim 14, wherein different visualization bands within the set of visualization bands comprise different colors, different shading patterns, or any combination thereof.

16. A non-transitory computer-readable medium storing code, the code comprising instructions executable by a processor to:

determine risk levels for a plurality of computing objects associated with a data management system, wherein a risk level for a computing object is determined based at least in part on a respective quantity of elements comprising sensitive information within the computing object and a respective quantity of users with access to the computing object;

select, for display, a subset of computing objects within the plurality of computing objects based on the risk levels for the plurality of computing objects; and display visualizations for the selected subset of computing objects in a user interface, wherein:

the visualizations for the computing objects within the selected subset of computing objects are positioned along an x-axis within the user interface based at least in part on a first metric from a set of metrics and are positioned along a y-axis within the user interface based at least in part on a second metric from the set of metrics, wherein:

the set of metrics comprises the respective quantities of elements comprising sensitive information within the computing objects, and the set of metrics further comprises the respective quantities of users with access to the computing objects, and the user interface is configured to receive a selection of a time period and reposition the visualizations for the computing objects along the x-axis, the y-axis, or both within the user interface in response to the selection of the time period based at least in part on the selected time period being associated with different respective quantities of elements comprising sensitive information within the computing objects, different respective quantities of users with access to the computing objects, or both.

17. The non-transitory computer-readable medium of claim 16, wherein the instructions to display the visualizations are executable by the processor to:

display a first type of visualization for computing objects that are associated with a change in risk level that satisfies a threshold amount of change within a threshold amount of time; and display a second type of visualization for other computing objects.

18. The non-transitory computer-readable medium of claim 17, wherein the first type of visualization comprises a different icon relative to the second type of visualization, a different color relative to the second type of visualization, a flashing icon, or any combination thereof.

19. The non-transitory computer-readable medium of claim 16, wherein the instructions to display the visualizations are executable by the processor to:

display the visualizations within a set of visualization bands in the user interface, wherein a visualization band corresponds to a range of risk levels for the selected subset of computing objects.

20. The non-transitory computer-readable medium of claim 19, wherein different visualization bands within the set of visualization bands comprise different colors, different shading patterns, or any combination thereof.

\* \* \* \* \*